March 5, 1968 N. R. NAIL 3,372,029

PROCESS FOR DEVELOPING PHOTOCONDUCTIVITY IMAGES
IN ZINC OXIDE PHOTOCONDUCTIVE LAYERS

Filed Oct. 29, 1964

NELSON R. NAIL
INVENTOR.

BY R. Frank Smith
Thomas R. Boston
ATTORNEYS 3,372,029

PROCESS FOR DEVELOPING PHOTOCONDUCTIVITY IMAGES IN ZINC OXIDE PHOTOCONDUCTIVE LAYERS

Nelson R. Nail, Rochester, N.Y., assignor to Eastman Kodak Company, Rochester, N.Y., a corporation of New Jersey Filed Oct. 29, 1964, Ser. No. 407,371
4 Claims. (Cl. 96—48)

ABSTRACT OF THE DISCLOSURE

A process for forming images on a photoconductive sheet characterized by the steps of imagewise exposing a photoconductive zinc oxide layer carried on an electrically conductive support, contacting the layer, while the exposed areas are electrically conductive, with a solution containing an ionizable soluble metal salt, and providing a direct electrical connection which bypasses the zinc oxide layer and connects the solution and the support. The process is conducted in the absence of an externally applied electric field. The scope of the present invention is defined by the following specification and claims.

Figure 1:
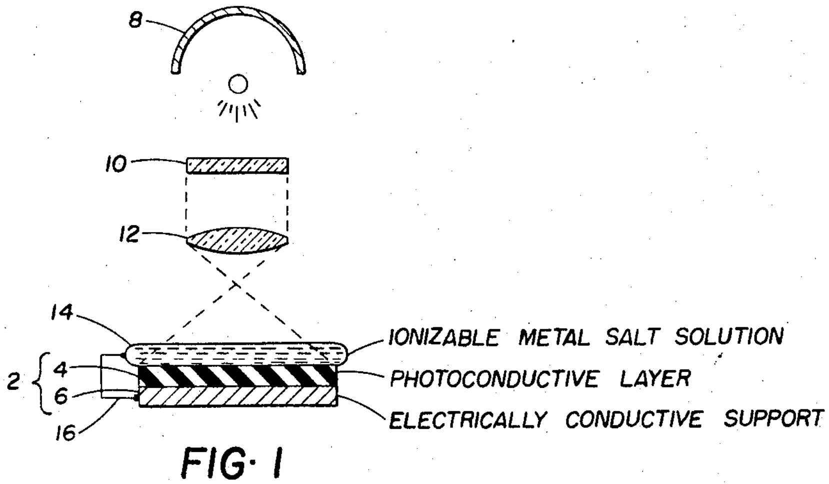

This invention relates to electrophotography and more particularly to a process for forming metallic images on image-wise exposed zinc oxide photoconductive layers.

Photoconductive layers of zinc oxide in resin binder coated on a conductive support are well known and are in commercial use in both xerographic and photoconductographic processes. It is also well known in certain photographic systems to produce a latent image consisting of disperse particulate matter (often referred to as nuclei or fogging agents), and then to intensify this image by employing such nuclei as centers for physical development. The process of the present invention does not require the high electrical voltages needed in xerography nor the high electrical current densities needed in photoconductography. The present invention provides a unique but simple method for producing an image on the same zinc oxide photoconductive sheet used in xerography and photoconductography. The image produced by the process of the present invention can be intensified by physical development either subsequent to or substantially simultaneously with the production of the image. Cross reference is herein made to U.S. patent application Ser. No. 215,079, Process for Silver Development of Photopolymerization Prints, by P. B. Gilman, Jr., et al., filed Aug. 6, 1962, now U.S. Patent No. 3,236,644, which discloses a process for silver development of photopolymerization images. Cross reference is also made to U.S. patent application Ser. No. 244,456, Silver Images in Light-Sensitive Print-Forming Layers, by P. B. Gilman, Jr., et al., filed Dec. 13, 1962, which discloses a process for forming a silver image in a light-sensitive layer having nuclei sensitized to light by an adsorbed photoreactive compound which inhibits physical development until exposed to light.

It is an object of the present invention to provide a process for recording radiation images.

It is another object of the present invention to provide a process for forming a metallic image on an imagewise exposed zinc oxide photoconductive layer, which process does not require an external voltage source.

These objects are accomplished by the following invention. An imagewise exposed zinc oxide in resin binder photoconductive layer on an electrically conductive backing is contacted with a solution containing an ionizable soluble metal salt while providing a direct electrical connection (this term, as used in the specification and claims, is here defined to mean a connection not containing a voltage source) between the solution and the backing. The following metals are useful in the process of the present invention: silver, copper, lead, nickel, gold, cobalt, iron, mercury and aluminum. This process produces a visible image which can, if desired, be intensified by physical development to produce a dense physical image on the photoconductive sheet. Applicant believes that the initial development in the process of the present invention is not the result of nucleation, but is the direct result of tiny photoproduced batteries in the image areas.

Figure 2:
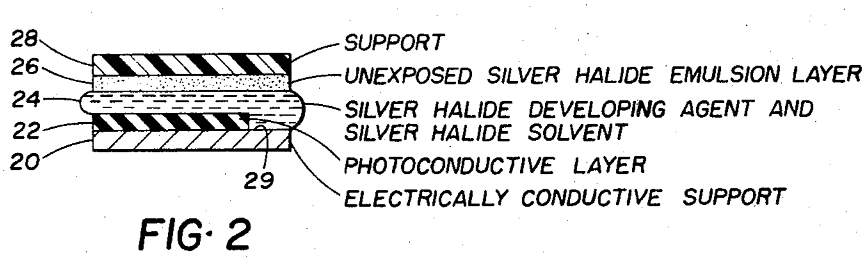

These and other objects of the present invention will be more fully understood by reference to the following detailed description when read in connection with the accompanying drawing, in which:

FIG. 1 shows one method for forming a metallic image on a zinc oxide in resin binder photoconductive sheet according to the present invention, and FIG. 2 shows another method for forming a metallic image on an imagewise exposed zinc oxide photoconductive layer according to the present invention.

FIG. 1 shows the imagewise exposure of a photoconductive sheet 2 consisting of a zinc oxide in resin binder layer 4 coated on an electrically conductive support 6, by means of a light source 8, a transparency 10, and a lens 12. This exposure step is essentially the same as that conventionally used, for example, in xerography and forms no part of the present invention. The imagewise exposed layer 4 is developed, according to the present invention, by contacting the layer 4 of the photoconductive sheet 2, during at least part of the time in which the exposed areas of the layer 4 are conductive, with an ionizable metal salt solution 14 while simultaneously providing a direct electrical connection 16 between the solution 14 and the conductive backing 6. This contacting step can be carried out during the exposure step or immediately following the exposure step (since the zinc oxide photoconductive layer exhibits persistence of conductivity) but must be carried out while the conductivity persists. This process produces a visible but weak image which can be intensified as described below, to produce a more dense image.

FIG. 2 shows another embodiment of the present invention. An imagewise exposed photoconductive layer 22 on a conductive support 20 is covered with a solution 24 containing a silver halide developing agent and a silver halide solvent. An unexposed silver halide emulsion layer 26 on a support 28 is placed in contact with the solution 24. The layer 26 acts as a donor layer. Electrical contact is made between the solution 24 and the conducting support 20 in this embodiment by forming the photoconductive sheet 22 in such a way that an edge 29 of the support 20 is uncoated so that the solution 24 comes into direct electrical contact therewith. Alternatively, an auxiliary electrode can be used to provide the direct electrical connection between the solution 24 and the support 20. The zinc oxide photoconductive layer itself is not a good enough electrical conductor to provide the electrical connection. Since a zinc oxide photoconductive layer exhibits persistent conductivity, the layer 22 can be imagewise exposed prior to placing it in contact with the solution 24 and the emulsion layer 26. Alternatively, if the layer 26 and the support 28 are transparent, the sandwich can be assembeld prior to the imagewise exposure step. The development in this embodiment is identical to that described above with reference to FIG. 1, however, in addition to the initial development obtained by the process shown in FIG. 1, this embodiment also accomplishes intensification of the image by physical development.

The present invention will be more fully understood by reference to the following examples:

*Example 1*

A sheet of photoconductographic material consisting of a layer of zinc oxide in resin binder coated on an aluminum foil paper laminate was exposed for 10 seconds to an intensity of 20 foot-candles through a high-contrast line-copy negative. The layer of zinc oxide-in-resin binder was coated on only about ⅔ of the area of the aluminum foil paper laminate backing, leaving a strip of uncoated aluminum foil along one edge of the sheet. This exposed sheet was contacted, by means of a roller, with a piece of unexposed fine-grain positive film, with thickened developer between the two sheets, and with the developer contacting the major portion of the bare aluminum foil along the edge of the sheet. After 1 minute transfer time, the sheets were separated and a distinctly visible image was found on the photoconductographic sheet and a reverse image was found in the emulsion layer of the film. Another experiment in which there was no electrical connection between the developer and the aluminum foil backing did not yield a visible image. The composition of the developer used in Example 1 was as follows:

| | | |
|---|---|---|
| Elon | grams | 4.0 |
| Hydroquinone | do | 5.0 |
| Hypo | do | 12.0 |
| Sodium carbonate | do | 50.0 |
| Sodium sulfite | do | 60.0 |
| 0.5 percent carboxymethyl cellulose | ml | 1000 |
| 1 percent arquad C | do | 40 |

pH adjusted to 11.0

An addition of 2 percent, by weight, of medium viscosity carboxymethyl cellulose was provided as a thickening agent. Arquad C was purchased from Armour and Company, and is a cationic quaternary ammonium salt of alkyltrimethyl ammonium chloride plus dialkyldimethyl ammonium chloride.

*Example 2*

The process of Example 1 was repeated except that no developer was allowed to touch the aluminum foil backing at the edge of the sheet. The layer of developer, however, was extended for a few inches and an auxiliary piece of aluminum foil was placed, slightly separated from the photoconductographic material but in electrical contact with part of the layer of developer. Voltage measurements between this auxiliary piece of aluminum foil and the aluminum foil backing of the photoconductographic sheet indicated that the aluminum foil backing of the photoconductographic sheet was held negative with respect to the auxiliary piece of aluminum foil by about 1.5 volts. An ammeter connected between the two pieces of aluminum foil indicated a current of about 0.003 ma. per $cm.^2$ of exposed area. After this current was allowed to flow for 1 minute the sheets were separated and a distinctly visible print was found on the photoconductographic sheet. It was also found that good prints were made if contact was established between the two pieces of aluminum foil for only the first few seconds of the 1 minute transfer time.

*Example 3*

The process of Example 1 was repeated with the exception that a solution was used which was the same as that of Example 1 but without the reducing agent. In this case, a very much weaker image resulted. Measurements indicated 6.6 times less silver deposited per unit area than in the experiment of Example 1 where the complete developer was used.

*Example 4*

The process of Example 1 was repeated except that the imagewise exposed photoconductive sheet was contacted with a solution containing 10 percent $NiCl_2 \cdot 6H_2O$ and 5 percent sodium thiosulfate, rather than with the film and solution of Example 1. After a development time of one min. the solution was removed and a distinct but weak visible image was found on the photoconductive layer. This image was then intensified by diffusion transfer physical development similar to that in Example 1 to produce a dense physical image.

In the developing or intersifying step of that embodiment of the invention shown in FIG. 2, any of the usual developing agents can be used such as dihydrohydroxybenzene; hydroquinone; certain hydroquinone compounds (e.g., chlorohydroquinone, dichlorohydroquinone, delmohydroquinone, etc.); 1-phenyl-3-pyrazolidene and its derivatives; triaminophenols; and the like. Silver halide emulsions useful as a donor sheet in this intensifying step comprise any of the conventional gelatin silver halide developing-out emulsions, e.g., gelatin silver chloride, -chlorobromide, -chloroiodide, -chlorobromoiodide, -bromide, and bromoiodide developing-out emulsions. The emulsions for use in the invention can include emulsions having a silver halide carrier other than gelatin, for example collodion, albumen, synthetic resins, and the like. The emulsions can be coated in the usual manner on a suitable support, e.g., glass, cellulose nitrate film, cellulose ester film, paper, or metal, etc. Such donor emulsions can contain sensitizers or other addenda for improving the character of the emulsion as is well known in the art, the silver halide emulsions useful in the process of the invention can be prepared according to known methods, such as those described in Hewitson and McClintock, U.S. Patent No. 2,618,556, issued Nov. 18, 1952.

This invention has been described in detail with particular reference to preferred embodiments thereof, but it will be understood that variations and modifications can be effected within the spirit and scope of the invention and as described hereinabove and as defined in the appended claims.

I claim:

1. A process for forming a metallic image on an imagewise exposed zinc oxide photoconductive layer carried on an electrically conductive support comprising:
   contacting said layer, while the exposed areas of said layer are electrically conductive, with a solution containing an ionizable soluble metal salt, the metal being selected from the class consisting of silver, copper, lead, gold, nickel, cobalt, iron and aluminum while providing a direct electrical connection which bypasses said layer and connects said solution and said support, said process being conducted in the absence of an external electric field.

2. A process for forming a metallic image on a zinc oxide photoconductive layer carried on an electrically conductive support comprising the steps of:
   imagewise exposing said layer to actinic radiation;
   contacting said layer, while the exposed areas of said layer are electrically conductive, with a solution containing an ionizable soluble metal salt, the metal being selected from the class consisting of silver, copper, lead, gold, nickel, cobalt, iron and aluminum; and
   providing a direct electrical connection which bypasses said layer and connects said solution and said support during said contacting step to produce an imagewise deposition of said metal on said layer, said process being conducted in the absence of an external electric field.

3. The process according to claim 2 including the step of intensifying said metallic image by physical development.

4. A process for forming a silver image in a zinc oxide photoconductive layer carried on an electrically conductive support comprising the steps of:
   imagewise exposing said layer to actinic radiation;
   contacting said layer, while the exposed areas of said layer are electrically conductive, with an unexposed silver halide emulsion layer carried on a backing layer with a layer of a solution between said photo-conductive and said silver halide emulsion layer, said solution comprising a silver halide solvent and a silver halide developing agent; providing a direct electrical connection which bypasses said layer and connects said solution and said support during said contacting step; and separating said silver halide emulsion layer from said photoconductive layer after a period of time sufficient for development of said photoconductive layer, said process being conducted in the absence of an external electric field.

References Cited

UNITED STATES PATENTS

| | | | |
|---|---|---|---|
| 3,052,541 | 9/1962 | Levinos | 96—27 |
| 3,152,903 | 10/1964 | Shepard et al. | 96—64 |
| 3,232,852 | 2/1966 | Vrbach et al. | 204—18 |

NORMAN G. TORCHIN, *Primary Examiner.*

C. E. VAN HORN, *Assistant Examiner.*